March 18, 1952 H. AHLMEYER 2,589,318
THRESHER ATTACHMENT
Filed May 9, 1949 4 Sheets-Sheet 1

Inventor
Harvey Ahlmeyer
By Clarence A. O'Brien
and Harvey B. Jacobson
Attorneys March 18, 1952 — H. AHLMEYER — 2,589,318
THRESHER ATTACHMENT
Filed May 9, 1949 — 4 Sheets-Sheet 2

Inventor
Harvey Ahlmeyer

March 18, 1952 H. AHLMEYER 2,589,318
THRESHER ATTACHMENT
Filed May 9, 1949 4 Sheets-Sheet 3
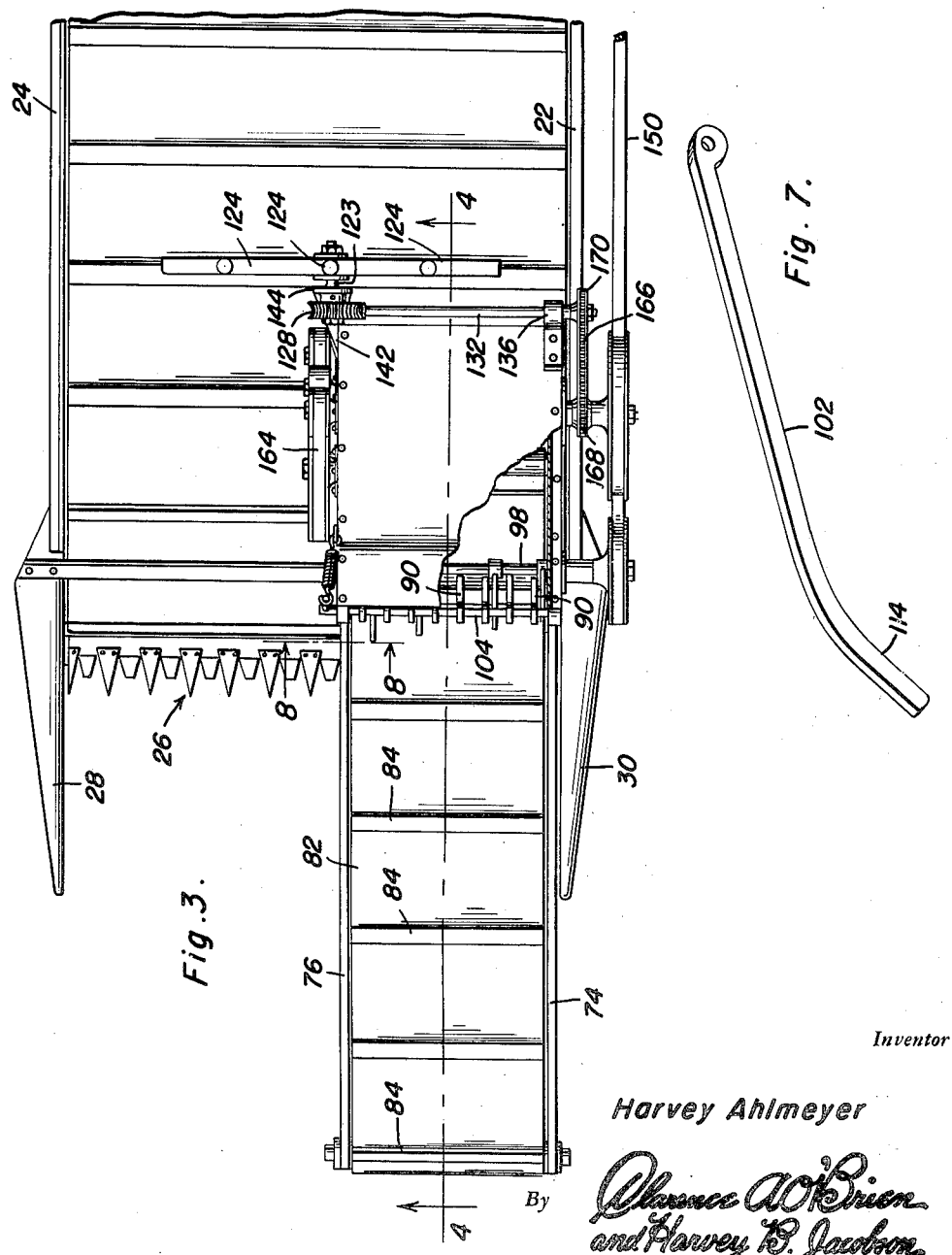
Inventor
Harvey Ahlmeyer
By *Clarence A. O'Brien and Harvey B. Jacobson*
Attorneys

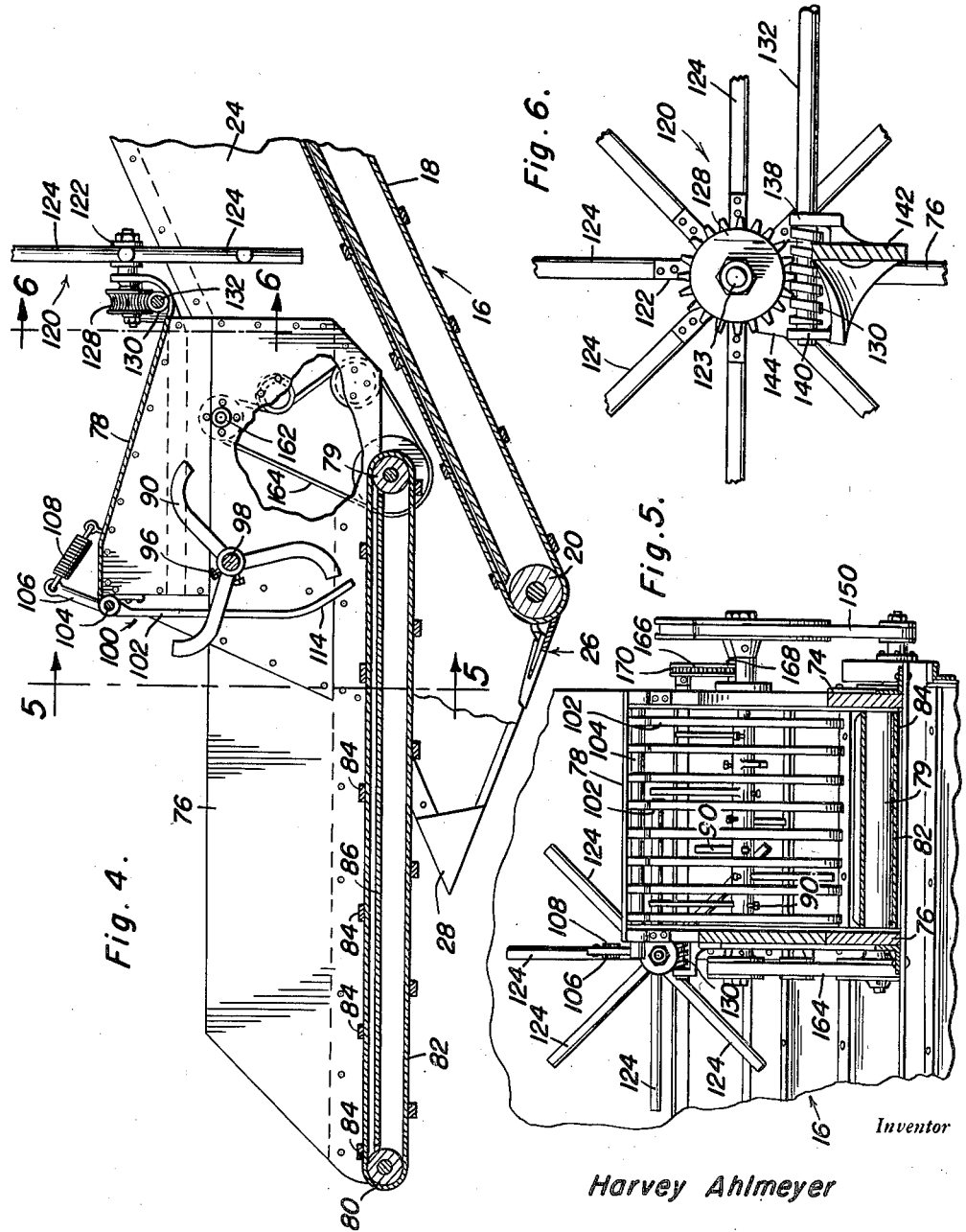

Patented Mar. 18, 1952

2,589,318

UNITED STATES PATENT OFFICE 2,589,318

THRESHER ATTACHMENT

Harvey Ahlmeyer, Ogallala, Nebr., assignor of one-half to Roscoe Lunger, Ogallala, Nebr.

Application May 9, 1949, Serial No. 92,180

1 Claim. (Cl. 130—1)

This invention relates to new and useful improvements in farm implements.

An object of this invention is to convert a standard combine into a relatively stationary threshing machine.

Another object of this invention is to attach a frame to a part of the elevator of a conventional combine, wherein bundles of material are placed on a conveyor which carry them within the travel of a cutter for cutting the cord holding the bundles together, the conveyor carrying the material of the bundles to the discharged end thereof, whereby they are deposited on the conventional elevator for a short travel toward the combine inlet. However, before entry into the combine proper, the material is spread laterally across the elevator, so that it may be introduced into the threshing portion of the combine in a rather even thickness.

Another object of this invention is to convert a conventional combine which depends upon its forward movement for proper operation in cutting the grain from the field, into a piece of stationary equipment whereby the elements for separating the straw from the grain may be utilized although the actual cutters of the combine are ineffectual.

Ancillary objects and features of novelty will become apparent to those skilled in the art in following the description of the preferred form of the invention, illustrated in the accompanying drawings, wherein;

Figure 3 is a plan view of the device as shown in Figures 1 and 2;

Figure 4 is an enlarged sectional view taken substantially on the line 4—4 of Figure 3 and in the direction of the arrows;

Figure 5 is an enlarged sectional detail of construction taken substantially on the line 5—5 of Figure 4 and in the direction of the arrows;

Figure 6 is a transverse sectional view of the attachment taken on a line 6—6 of Figure 4 and in the direction of the arrows;

Figure 7 is a perspective view of one of the arms which forms a grate used in conjunction with the attachment;

Figure 1:
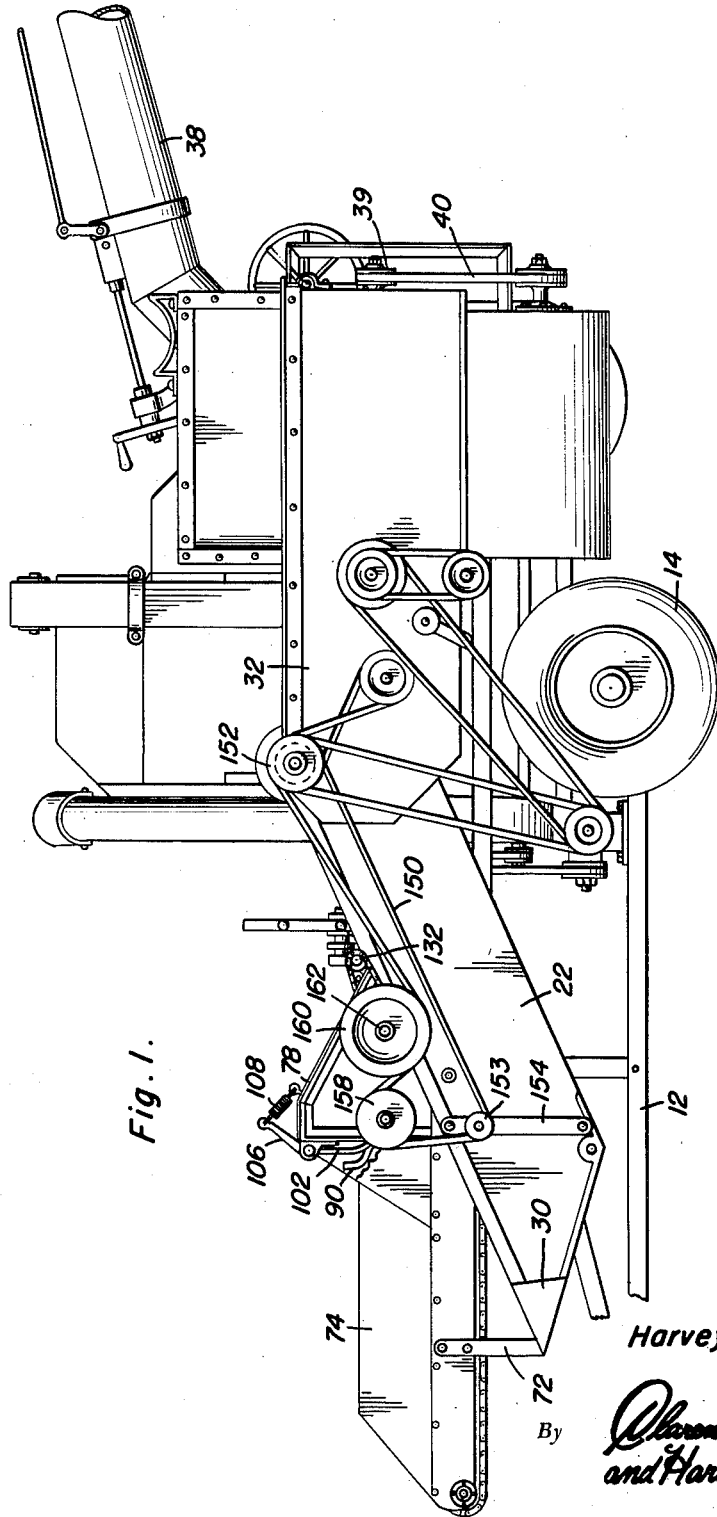
Figure 1 is an elevational side view of a conventional combine having the attachment which forms an embodiment of the instant invention fixed thereto in operative position.

Combines are large pieces of machinery or equipment which depend on the forward movement thereof through a field for cutting the growing material and for conducting it into a mechanism whereby the grain is separated from the straw. It has been recognized that the separation members in the combine could be used to great advantages even when the combine was not in u and not depending on its forward movement for cutting the growing material. With this in view the instant invention provides an attachment for a combine and is fixed specifically to the combine elevator sides for receiving bundles of material which have already been cut and bound by means of a cord. These bundles are opened, that is the cord is cut and the material in the bundles is conveyed to the elevator after it has been spread across the elevator in a thickness which is substantially uniform, so that it may be moved by means of the elevator into the conventional apparatus for separating the straw from the grain. This attachment therefore converts a conventional combine for stationary use whereby the separation mechanism of the combine is put into play, although the cutters at the forward end of the combine are not used.

A conventional combine generally indicated at 10 is illustrated and includes various structural features, some of which are important insofar as the instant invention is concerned and some of which are unimportant. To illustrate the actual treatment of the grain and straw, certain details of constructions are set forth rather specifically in the drawings and other structural members are indicated merely to show environment.

The combine has a draw bar 12, wheels 14 and a main chassis or frame supporting various elements. At the forward end of the combine there is an elevator generally indicated at 16 and which consists of an endless conveyor 18, disposed around conventional rollers 20.

The elevator 16 also includes sides 22 and 24 and the cutter mechanism generaly indicated at 26 which is disposed between the baffles 28 and 30, respectively.

After conveyance of the material by means of the elevator, it is deposited through the medium of a frontal opening in the separation chamber member 32. Conventional equipment is disposed in this chamber member whereby the grain is separated from the straw, the grain being deposited in the blower housing whereby the rotor urges the grain upwardly through the stack 38. The blower rotor is operated by means of a pulley 39, receiving its energy through the medium of the belt 40, from a suitable source of power in the combine.

Referring more specifically now to the conventional elevator generally indicated at 16, by inspection of Figures 3 and 4, it is apparent that the inlet portion of the elevator is encumbered with an attachment. This attachment is removably carried by the sides 22 and 24 through the medium of bolts, brackets 72 and the like.

The attachment is preferably removed when the combine is put to its conventional use. But, if it is found desirable or deemed more expedient, the attachment may be so disposed as to be permitted disposition on the sides 22 and 24 when the combine is being pulled through a field. The said attachment consists of side pieces 74 and 76, respectively which are carried by and which actually form a part of a frame. This frame has a top 78 partially covering the sides 76 and 74 and is preferably made of iron, wood or steel.

Spaced rollers 79 and 80 respectively, are mounted for rotation in the sides or side pieces 74 and 76 and have an endless conveyor belt 82 with slats 84 thereon, and trained therearound. A support 86 of conventional description is disposed below the upper part of the endless conveyor belt 82 and is carried by the framing of the attachment.

Figure 8:
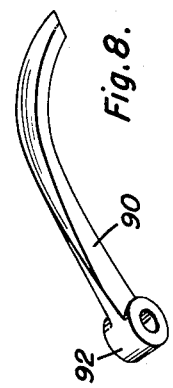
Figure 8 is a perspective view of one of the cutter blades used on the cutter or cord holding the bundles of material together; and, Figure 9 is a special bracket used in connection with the attachment and which serves the purpose of providing bearings for certain operative elements.

Disposed above the endless conveyor and adjacent the discharge end thereof is a cutter for cutting the cord conventionally found around bundles of field cut material. This cutter consists of a number of blades such as the one shown in Figure 8 and indicated at 90. As shown in Figure 8, this blade has a boss 92 at the inner end thereof wherein there is a set screw 96 (Figure 4) disposed. This set screw bears against a shaft 98 mounted for rotation in the framing of the attachment. The blades may be staggered as illustrated in Figure 5.

A grate generally indicated at 100 is mounted for pivotal movement on the sides 74 and 76 and at the front of the top 78. This grate consists of a number of arms 102 which are secured to an upper shaft or bar 104 having an extension 106 projecting therefrom at one side. These bars 102 are disposed between the blades 90 so that the blades may pass through freely when the cutter is in operation.

A spring 108 is attached at one end to the extension 106 and re-acts on the top 76 of the attachment. This spring constantly opposes the operation of the entire grate or gates since the spring has to be stretched or put in tension in order for the grate to be swung. The lower ends of the arms 102 are curved as at 114 so as to guide the bundles of field cut material as they are being urged inwardly through the medium of the conveyor belt 82.

In operation, the bundles of material are disposed on the endless conveyor belt 82 and carried forward until they pass through the grate arms or bars 102 and until the strings or cords thereof are cut by means of the cutter. Then, the material of the bundles is conveyed inwardly until it is discharged from the discharge end of the endless conveyor belt 82. At that time it is deposited by means of gravity on the elevator belt 18. However, after going only a short distance up the elevator, the material is spread sideways across the elevator as limited by the confines of the wall or side 24. The spreader generally indicated at 120 is used for the purpose of pushing the material across the elevator so that it is placed on the elevator in a substantially uniform thickness. This prevents a large bundle which although the string has been cut, from entering the separation chamber member.

Figures 2, 9:
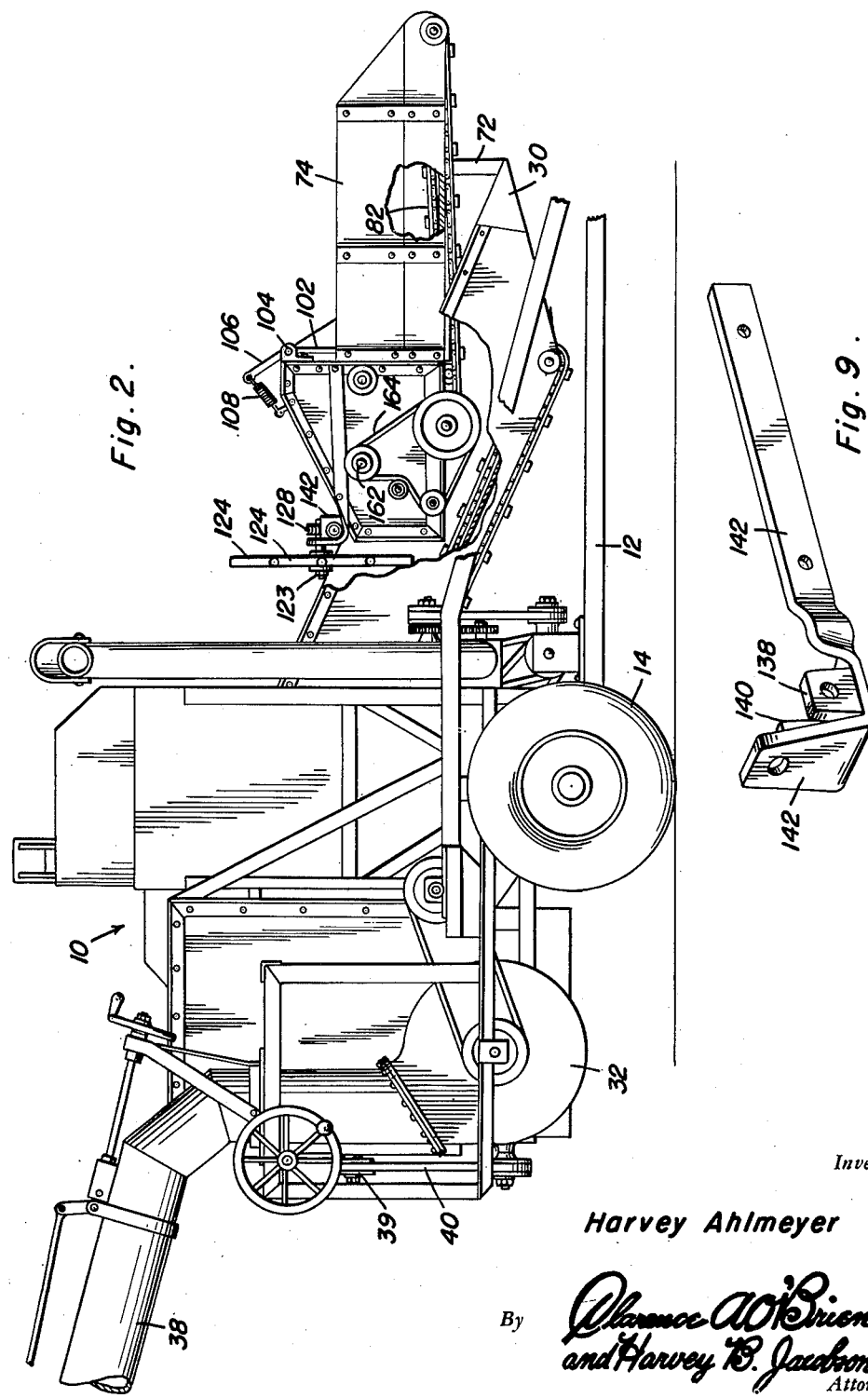
Figure 2 is an elevational view of the device shown in Figure 1, portions being broken away to illustrate detail of construction of the actual attachment.

Reference to Figure 6 shows the specific structure of the spreader. A hub 122 has a number of spokes 124 extending therefrom in radial fashion. This hub is disposed on a small shaft 123 which has a gear 128 attached thereto. A worm 130 is enmeshed with the gear 128 and is operated by means of a power shaft 132. This power shaft is supported by means of a bearing 136 (Figure 3) adjacent one end and secured in the spaced bearings 138 and 140 respectively (Figure 9), which are fixed to the arm 142. This arm is carried by side 76 and has an upstanding member or ear 144; the said upstanding member 144 supports the said shaft 123 which is used in connection with the spreader.

In noting Figure 1 it will be seen that various belting is provided for the purpose of operating the conventional elements within the combine which separate the straw and the grain. Attached to this belting is a belt 150 which is operated off a live pulley 152 and which is entrained around an idler 152, supported on a suitable brace 153.

The belt 150 also is entrained around the pulley 158 which is fixed to the end of the shaft 98, carrying the cutters 90. The belt is further entrained around the conveyor pulley 160 which is secured to the countershaft 162, used to drive the conveyor through the medium of the belt 164, disposed on the opposite side of the attachment as disclosed in Figure 3. A chain 166 is entrained around suitable sprockets 168 and 170, respectively which are in turn secured to the countershaft 162 and the lay shaft 132.

In viewing Figure 4 it is seen that the belt 164 is entrained around the various idler and work pulleys secured to the side of the attachment opposite that having the belt 150 in operation thereon. This transmits the power or torque from the combine prime mover or source of power to a smooth operating unit including the endless conveyor belt 82, the cutter mechanism for the bundle of cords or strings and the spreader 120.

While it has been described and illustrated but one form of the invention, it is apparent that variations may be made without departing from the spirit of the invention.

Having described the invention, what is claimed as new is:

An attachment for a combine which includes an elevator having sides and a longitudinal axis, said attachment comprising a frame detachably carried by at least one of said sides, a conveyor disposed on said frame and above said elevator and having its longitudinal axis substantially parallel to the first mentioned axis, a bundle cord cutter carried by said frame for cutting the cord on bundles moved by said conveyor, means for operating said cutter and said conveyor from power of the combine, a rotary spreader drivingly connected with said operating means and including spokes arranged to rotate in a plane normal to said axes, said spreader being disposed behind said cutter and above said elevator, said spreader being carried by said frame to spread the material of the bundles transversely of said axes after the cords thereof have been cut, said spreader being disposed in part between said sides and above said elevator whereby the spread material is directed against the elevator for conveyance into a part of the combine, a plurality of arms pivotally carried by said frame above said conveyor and forming a grate, said cutter blades being passed between said arms, means connecting said arms together so that the arms move in unison, and a spring fastened to the last mentioned means and said frame yieldingly opposing the pivotal movement of said arms.

HARVEY AHLMEYER.

REFERENCES CITED

The following references are of record in the file of this patent:

UNITED STATES PATENTS

| Number | Name | Date |
|---|---|---|
| 487,347 | Conn | Dec. 6, 1892 |
| 517,754 | Lamm et al. | Apr. 3, 1894 |
| 689,992 | Slutz | Dec. 31, 1901 |
| 902,391 | Footitt | Oct. 27, 1908 |
| 1,260,014 | Nichols | Mar. 19, 1918 |
| 1,440,391 | Kane | Jan. 2, 1923 |
| 1,913,172 | Schlayer | June 6, 1933 |
| 2,143,749 | Wessman | Jan. 10, 1939 |
| 2,150,976 | Kilberger | Mar. 21, 1939 |
| 2,362,492 | Livermon | Nov. 14, 1944 |